United States Patent [19]
Dezonno et al.

[11] Patent Number: 5,991,394
[45] Date of Patent: Nov. 23, 1999

[54] METHOD AND SYSTEM FOR ESTABLISHING VOICE COMMUNICATIONS USING A COMPUTER NETWORK

[75] Inventors: Anthony J. Dezonno, Downers Grove; William R. Quayle, Naperville, both of Ill.

[73] Assignee: Rockwell International Corporation, Costa Mesa, Calif.

[21] Appl. No.: 09/019,090

[22] Filed: Feb. 5, 1998

Related U.S. Application Data

[63] Continuation of application No. 08/426,533, Apr. 21, 1995, abandoned.

[51] Int. Cl.$^6$ .................................................. H04M 11/00
[52] U.S. Cl. .................. 379/265; 379/266; 379/93.24; 370/352
[58] Field of Search .................................... 379/265, 266, 379/209, 93.24, 90.01, 93.12, 93.17; 370/352

[56] References Cited

U.S. PATENT DOCUMENTS

| | | | |
|---|---|---|---|
| 4,809,272 | 2/1989 | Torgrim et al. | 379/386 |
| 4,837,798 | 6/1989 | Cohen et al. | 379/88.14 |
| 5,029,200 | 7/1991 | Haas et al. | 379/88.18 |
| 5,181,236 | 1/1993 | LaVallee et al. | 379/88.22 |
| 5,206,903 | 4/1993 | Kohler et al. | 379/309 |
| 5,333,266 | 7/1994 | Boaz et al. | 379/93.15 |
| 5,448,626 | 9/1995 | Kajiya et al. | 379/88.13 |

OTHER PUBLICATIONS

"The Voice of Technology", Credit World, vol. 82, No. 6 pp. 20–23, Jul. 1994 by Kuehn, Richard A. (379/265).
"Telecommunications Buyers Guide and Directory". Editor & Publisher, vol. 127, No. 7, pp. 29TC–38TC, Feb. 1994.
"Internet Dialtone: I'd Rather Switch than Fight", Telemedia News & Views Newsletter, vol. 3, No. 10, Oct. 1995.
"Aspect Telecomm: Aspect Integrates the Web into the Call Center to Deliver New Level of Customer Service", M2 Presswire, Aug. 1996.

*Primary Examiner*—Scott Wolinsky
*Attorney, Agent, or Firm*—Welsh & Katz, Ltd.

[57] ABSTRACT

A method and system (100) establishes voice communications between a computer user (102) and an agent (104) of a business over a computer network, such as the Internet (108). Using a user computer (106), the computer user (102) views advertisments of the business' products or services on the Internet (108) via customized home pages (200). When the user (102) wishes to order a product or ask additional questions about a product, the user (102) activates a "call me" button (210). A return call screen (300) is then presented to the user (102) with areas to insert a name (302), a telephone number (304) and a time to call (306). This information is packetized in a call request which is transmitted over the Internet (108) to a telephone switching system (112) associated with the business. The telephone switching system (112) subsequently dials the telephone number (304) at the time to call (306). When the user (102) answers a computer user telephone (120), the telephone switching system (112) connects the user (102) wuth the agent (104) via an agent telephone (118). The telephone switching system (112) may be comprised of a telephone computer (114) and an automatic call distributor (116).

27 Claims, 2 Drawing Sheets

METHOD AND SYSTEM FOR ESTABLISHING VOICE COMMUNICATIONS USING A COMPUTER NETWORK

This application is a continuation of application Ser. No. 08/426,533 filed on Apr. 21, 1995, now abandoned.

BACKGROUND OF THE INVENTION

The present invention relates generally to a method and system for establishing voice communications between a computer user and a business and, more particularly a method and system for establishing voice communications between a computer user and an agent of a business via a computer network, such as the Internet, wherein the computer user transmits a call request over the computer network to a telephone switching system associated with the agent and, in response to the call request, the telephone switching system calls the computer user and connects the agent to the computer user when the computer user answers the call.

Computer users are increasingly interacting with other computer users via extensive computer networks. The computer users are able to perform a multitude of tasks over computer networks, such as buting concert tickets, checking stock prices, reviewing news stories, and the like. One extensive, international computer network is the Internet. The Internet was originally created to electronically interconnect government and university computers over telephone lines. The Internet has now grown, however, to encompass over 20 million users worldwide including single user computers.

As the number of Internet users proliferate, businesses are increasingly turning to the Internet as an advertising medium. Over 2,500 businessed currently advertise on the Internet in the form of home pages on the World Wide Web (the "Web"). As is well known by those in the art, the Web, which is organized by subject matter, is an advanced system for navigating the Internet. Home pages are the first screens of the different Web sites.

Computer users are therefore able to quickly and easily review a multitude of products and services which are offered by businesses advertising on the Internet. Unfortunately, a user is currently unable to obtain additional information regarding products or services in such a convenient and efficient manner. To obtain additional information, the user must record the telephone number of a particular business and manually call the business.

As those in the direct response advertising business will readily attest, the success of direct response advertising depends greatly upon the ease in which a potential customer can contact those selling the products or services. The additional steps of manually recording the telephone number and dialing the telephone number may therefore deter potential customers from further inquiry and possibly result in lost sales.

In addition, most individual consumers have a single telephone line in their home which is shared between voice connections for telephone calls and data connections for connecting to the Internet, for example. The typical consumer is thus unable to access the Internet while concomitantly making a telephone call to the business. Advantageously, many businesses have separate telephone lines for data and voice communications. Business computer users are thus able to conduct business simultaneously over both a telephone and a computer.

Further, lack of security, reliability and accountability restrict the ability of consumers to purchase goods over the Internet. Although some purchases can be made over the Internet using a credit card, the threat of someone fraudulently obtaining their credit card number through the computer network compels a majority of consumers to pay for the goods off-line, typically over the telephone using the previously described process.

Accordingly, there is a need in the art for a method and system for establishing voice communications between a computer user and an agent of a business wherein the computer user instructs a telephone switching system located at the business to call the computer user over the telephone. When the computer user answers the call, the telephone switching system automatically connects the agent to the computer user.

SUMMARY OF THE INVENTION

This need is met by the method and system of the present invention for establishing voice communications between a computer user and an agent wherein the computer user sends a call request over a computer network, such as the Internet, to a telephone switching network associated with the agent. The call request preferably includes a name of the computer user, a telephone number of a telephone associated with the computer user and a time to call. The telephone switching network detects the information contained in the call request and dials the computer user telephone at the designated time to call. When the computer user answers the computer user telephone, the telephone switching system connects an agent telephone associated with the agent to the computer user telephone.

In accordance with one aspect of the present invention, a method for establishing voice communications between a computer user which is associated with a computer and a telephone and an agent is provided. The method comprises the steps of: entering a call request by the computer user in the computer for the agent to call the computer user; transmitting the call request from the computer over a computer network to a telephone switching system; and establishing voice communications between the agent and the computer user through the telephone switching system.

In accordance with another aspect of the present invention, a communications system for establishing voice communications between a computer user and an agent is provided. The computer user being associated with a computer user telephone and entering a call request into a computer. The communications system comprise an agent telephone associated with the agent and telephone switching for receiving the call request from the computer, for dialing the computer user telephone and for interconnecting the agent telephone and the computer user telephone.

Preferably, the telephone switching system comprises a telephone computer for receiving the call request from the computer. An automatic call distributor for automatically dialing the computer user telephone in response to the telephone computer and for interconnecting the agent telephone and the computer user telephone. The automatic call distributor preferably comprises anser means for detecting when the computer user answers the computer user telephone, and wherein the automatic call distributor connects the agent to the computer user telephone when the computer user answers the computer user relephone. The call request may comprise a time to call the computer user and the telephone computer may comprise time means for detecting the time to call the computer user from the call request; and dial means responsive to the time means for promoting the automatic call distributor to call the computer user telephone at the time to call.

It is a feature of the present invention to provide a method for a computer user to easily and conviently have a business advertising on a computer network, such as the Internet, call the computer user back over the telephone.

These and other features and advantages of the present invention will become apparent from the following detailed description, the accompanying drawings and the appended claims.

DETAILED DESCRIPTION OF THE INVENTION

Figure 1:
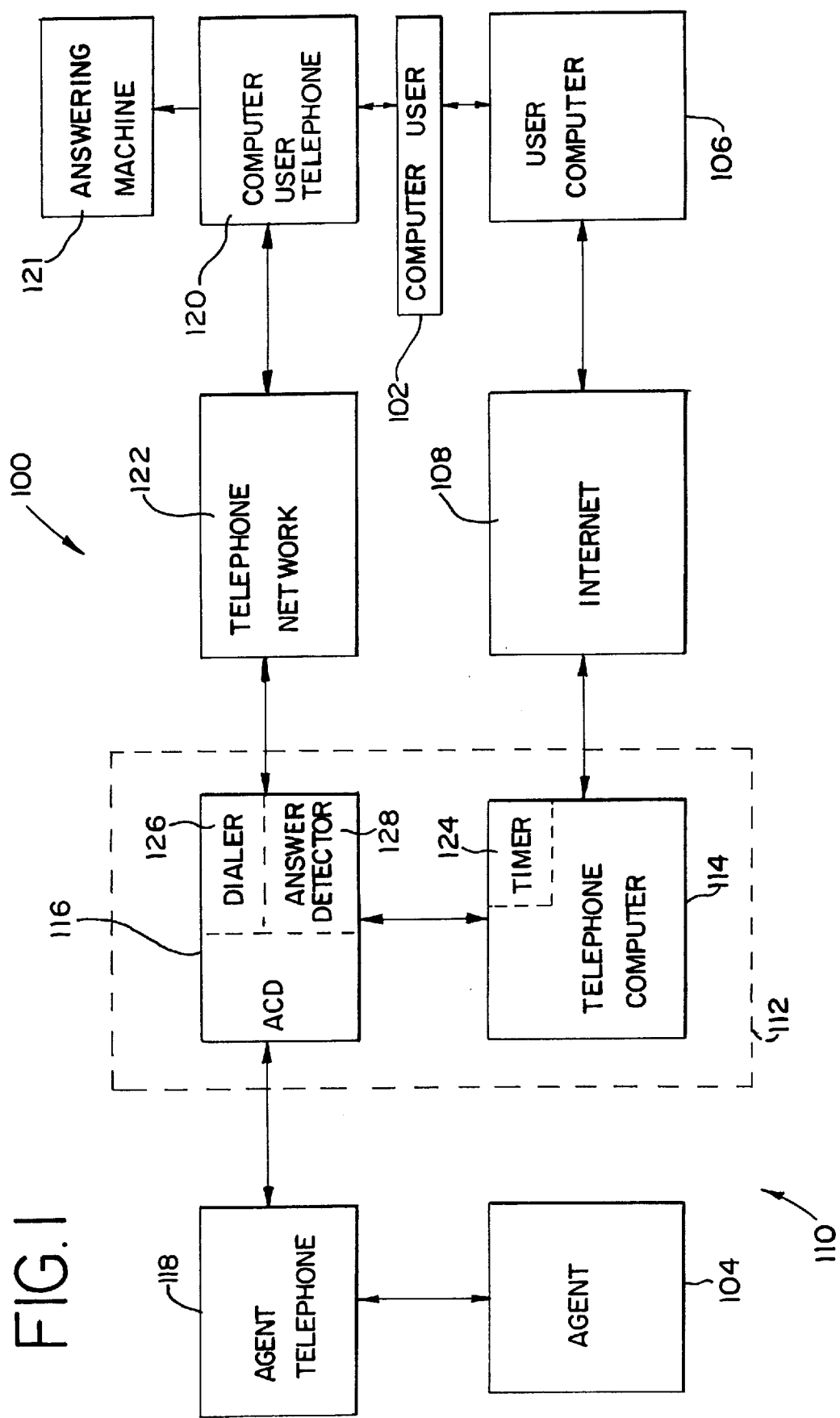
FIG. 1 is a block diagram of a system for establishing voice communications between a computer user and an agent in accordance with the present invention.

A communications system 100 for establishing voice communications between a computer user 102 and an agent 104 is shown in FIG. 1. The computer user 102 uses a computer user 106 to communicate with other computers through a computer network, such as, for example, the Internet 108, in a well known manner. Although the invention will be described with reference to the Internet, it should be understood that the invention may be advantageously employed with any of a number of computer networks, such as conventional bulletin boards.

Modern businesses usually have an automated system, generally referenced by numeral 110, for handling inbound and outband telephone calls. For example, a business may be connected to the Internet 108 via a telephone switching system 112. The telephone switching system 112 comprises a telephone computer 114 connected to an automatic call distributor (ACD) 116, preferably Rockwell International's SPECTRUM Automatic Call Distribution System. The ACD 116, or alternatively a private branch exchange (PBX), operates in a well known manner to connect an agent telephone 118 associated with the agent 104 to external telephonic units, such as a computer user telephone 120 associated with the computer user 102. Although only one agent 104 is shown, businesses typically have a plurality of agents for answering tlephone calls. As will be readily apparent to those skilled in the art, the present invention may be advantageously employed with a business having more than one agent. The ACD 116 is connected to the computer user telephone 120 through a telephone network 122. A conventional answering machine 121 is connected to the computer user telephone 120.

Operation of the communications system 100 will now be discussed with reference to FIGS. 2 and 3. The computer user 102 uses the user computer 106 to review a multitude of products and services advertised on the Internet 108. Businesses on the Internet 108 advertise on the World Wide Web using home pages. As is well known, home pages may include pictures of a product, descriptions of the product and a listing of a telephone number to call to ask questions or to order the product.

Figure 2:
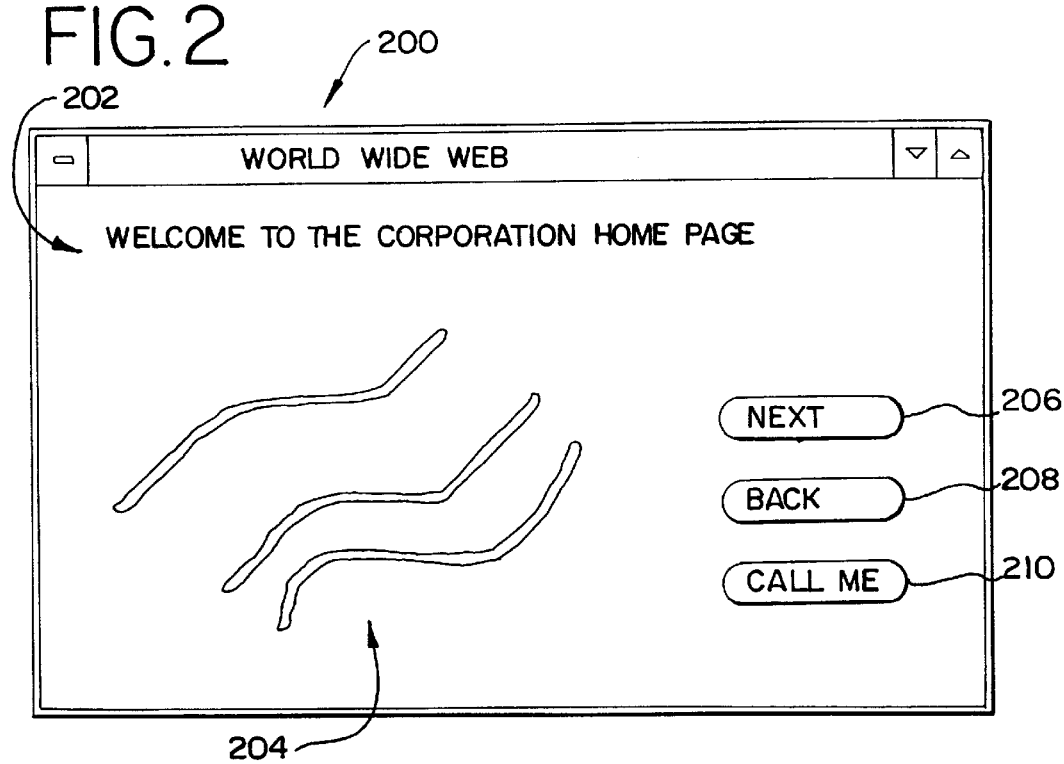
FIG. 2 shows an exemplary home page used for advertising by, for example, a business on the Internet.
Figure 3:
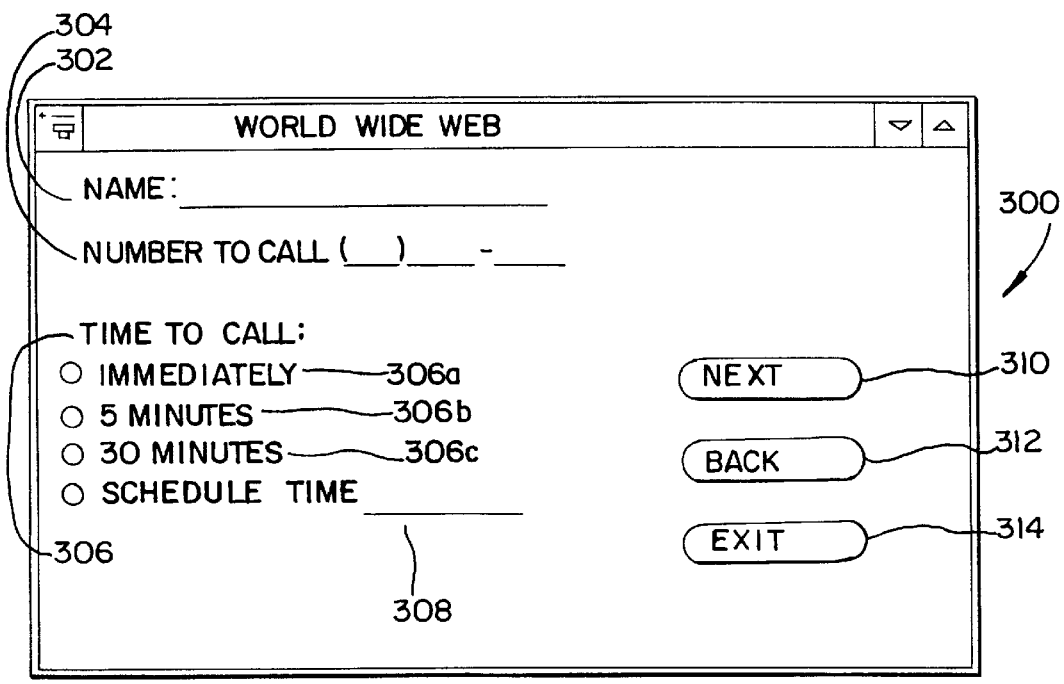
FIG. 3 shows an exemplary return call screen used by the computer user request a return call from the business.

An exemplary home page 200 which may be used to advertise a product is shown in FIG. 2. As is well known, the home pages 200 on the World Wide Web use hypertext technology to enable computer user 102 to move from one computer data base to another at the click of a mouse. The home page 200 includes a text portion 202 describing the product or service. When activated, "next" and "back" buttons 206, 208 transfer the computer user 102 to the next home page or to the previous home page, respectively. Additionally, the above information may be entered as conventional text commands.

If the computer user 102 wants to establish voice communications with the business to order a product or to ask a question, the computer user 102 activates a "call me" button 210. In response, the computer user 102 is transferred to a return call screen 300 shown in FIG. 3. The computer user 102 then enters a name 302, a telephone number to call 304 and a time to call 306 in their respective fields. Alternatively, the computer user'3 name and telephone number may be kept on file and be automatically entered in the appropriate fields in a well known manner.

For ease of operation, a list of frequently requested times in which to call may be listed, such as immediately 306a, 5 minutes 306b or 306c. In this case, the computer user 102 would simply click on the desired time. If needed, another time can be entered by the computer user 102 in a designated area 308. After filling in the requested information, the computer user 102 activates a "next" button 310 to send a call request to the telephone switching system 112. "Back" and "exit" buttons 312, 314 are activated to exit the home page 300 wothout sending the call request.

Additional information may be included in the call request for processing by the telephone switching network 112. For example, the number of the home page 200 which prompted the call request may be included in the call request. This information is used by the telephone switching system 112 to route the call to an agent having the appropriate knowledge about the product or service which prompted the call. Additionally, the agent 104 can be viewing the home page 200 on a conventional computer display, or other displays, when conversing with the computer user 102 over the agent telephone 118. Numerous displays are well known in the art and may be advantageously employed in the invention.

Preferably, a Web server of the business packetizes the name 302, telephone number 304 and the time to call 306 information into a single conventional electronic mail (E-mail) message (designated a "call request") which is sent over the Internet 108. Alternatively, program to program communications, such as Transmission Control Protocol/ Internet Protocol (TCP/IP) sockets which are well known in those skilled in the art, may be used as a means to send the information from the operator computer 106 to the telephone switching system 112.

The telephone computer 114 of the telephone switching system 112 receives the call request, detects the time to call 306 and converts the call request into a predictive dial request command, which is formatted for proper receipt by the ACD 116. The telephone computer 114 may detect the time to call 306 in the call request and delay transmitting the call request to the ACD 116 until the time to call. The telephone computer 114 comprises timer 124, for detecting the time to call 306 in the call request. The timer 124 may be implemented by software. The ACD 116 would then attempt to dial the telephone number 304 substantially immediately upon receipt of the dial request command.

Alternatively, the telephone computer 114 may transmit the dial request command, which includes the time to call 306 information, substantially immediately upon receipt of the call request. The ACD 116 would then detect the time to call 306 and delay the outbound dialing of the telephone number 304 until that time. Either the ACD 116 or the telephone computer 114 may therefore control when the telephone number 304 is dialed based on the time to call 306.

Preferably, the ACD 116 uses predictive outbound dialing to call the computer user telephone 120. Systems for providing predictive outbound dialing from the ACD 116 are well known in the art. One such system is described in commonly assigned U.S. Pat. No. 4,881,261, the disclosure of which is hereby incorporated by reference.

The telephone computer 114 sends the dial request command to the ACD 116 for call processing. A dialer 126 in the ACD 116, which is preferably software based, then places an outbound telephone call to the computer user telephone 120 in a well known manner. Answer detector 128 in FIG. 1 in the ACD 116 detects when the computer user 102 answers the call, as distiguished from an automated answering machine, a busy signal or no answer. One such means for detecting whether a human answers a telephone call is disclosed in commonly assigned U.S. Pat. No. 4,809,272, the disclosure of which is hereby incorporated by reference.

When the computer user 102 answers the telephone, the ACD 116 connects the computer user telephone 120 to the agent 104 through the agent telephone 118. Various methods are well known in the art for selecting an agent to connect the the telephone call. Since the philosophy of such methods are not important to the present invention beyond connecting the telephone call to the agent 104, details will not be further given herein. Those desiring additional information regarding methods and systems for selecting agents are referred to U.S. Pat. No. 5,206,903 which is incorporated herein by reference.

Alternatively, the telephone computer 114 may dial the computer user telephone 120 directly and connect the agent telephone 118 to the computer user telephone 120 when the computer user 102 answers the call. As is well known in the art, commercial telephone cards are available for personal computers for dialing external telephones. After the computer user 102 answers the call, the telephone computer 114 then dials a telephone number, or extension, to access the agent telephone 118 and thereafter connect the agent 104 to the computer user 102.

In addition, the ACD 116 may transmit information to the agent 104 prior to, or simultaneously with, connecting the agent 104 to the computer user 102. This information may comprise the computer user's name or other information. The information may be displayed on the display of the agent 104 or provided to the agent 104 in any other appropriate manner. Those skilled in the art will likely be able to readily design numerous telephone switching systems using commercially available components for receiving the call request and automatically dialing the computer user telephone 120. Any telephone switching system which can establish voice communications between the computer user 102 and the agent 104 can be advantageously employed in the present invention.

A method for establishing voice communications between an computer user 102 and an agent 104 is provided in the present invention. In particular, a method is provided for establishing voice communications between the computer user 102, associated with a computer 106 and a telephone 120, and an agent 104. The method comprises the steps of entering a call request from the computer 106 over a computer network, such as the Internet 108, to a telephone switching system 112. Voice communications are then established between the agent 104 and the computer user 102 answers the telephone 120.

Further, the step of entering the call request may comprise the step of entering a telephone number of the telephone 120 associated with the computer user 102 and wherein the step of automatically dialing the telephone 120 comprises the step of dialing the telephone number. The step of entering the call request may comprise the step of entering a time to call the computer user 102 and wherein the step of automatically dialing the telephone 120 comprise the step of automatically dialing the telephone 120 at the time to call. The step of entering the call request may comprise the step entering a name of the computer user 102 and wherein the method comprises the step of indicating to the agent 104 the name of the computer user 102 before establishing voice communications between the agent 104 and the computer user 102.

The step of automatically dialing the telephone may comprise the steps of sending a dial request command from a telephone computer 114 to an automatic call distributor 116 associated with the agent 104 and automatically dialing the telephone 120 by the automatic call distributor 116 in response to the dial request command. Further, the step of automatically connecting the agent 104 comprises the steps of: determining when the computer user 102 answers the telephone 120 and automatically connecting the agent 104 to the telephone 120 when the computer user 102 answers the telephone 120.

Having thus described the invention in detail by way of reference to preferred embodiments thereof, it will be apparent that other modifications and variations are possible without departing from the scope of the invention defined in the appended claims. For example, the telephone switching system 112 may have design configurations which depart from those described therein.

What is claimed is:

1. A method for establishing voice communications between a computer user and an agent, the computer user being associated with a user computer and a telephone number of a telephone associated with the computer user, the method comprising the steps of:

establishing a computer data base accessible by the user computer;

prompting the computer user to enter a call request in the computer data base;

transmitting the call request from the computer data base to a telephone switching system; and automatically establishing voice communications between the agent and the computer user by the telephone switching system in response to the call request.

2. The method as recited in claim 1 wherein the step of establishing voice communications between the agent and the computer user by the telephone switching system in response to the call request further comprises the step of the telephone switching system automatically dialing the telephone number of the telephone associated with the computer user.

3. The method as recited in claim 2 wherein the step of transmitting the call request comprises the step of transmitting the call request from the computer data base over the Internet.

4. The method as recited in claim 3 wherein the step of transmitting the call request from the computer data base over the Internet further comprises the steps of:

packetizing the call request; and transmitting the call request by e-mail.

5. The method as recited in claim 2 wherein the telephone switching system includes a telephone computer and wherein the step of automatically dialing the telephone number of the telephone associated with the computer user comprises the steps of:

receiving the call request at a telephone computer associated with the agent; and dialing the telephone number by the telephone computer based on the call request.

6. The method as recited in claim 5 further comprising the steps of:

detecting when the computer user answers the computer user telephone; and connecting the agent to the answered computer user telephone.

7. The method as recited in claim 1 wherein the step of prompting the computer user to enter the call request comprises the step of prompting the computer user to enter the telephone number of the computer user telephone.

8. The method as recited in claim 1 wherein the step of prompting the computer user to enter the call request comprises the step of prompting the computer user to enter a time to call the computer user; and wherein the step of automatically dialing the telephone number comprises the step of automatically dialing the telephone number at the time to call.

9. The method as recited in claim 1 wherein the step of prompting the computer user to enter the call request comprises the step of prompting the computer user to enter a name of the computer user; and wherein the method comprises the step of indicating to the agent the name of the computer user before establishing voice communications between the agent and the computer user.

10. The method as recited in claim 1, wherein the automatically dialing telephone number of the telephone associated with the computer user comprises the steps of:

sending a dial request command from a telephone computer to an automatic call distributor associated with the agent in response to the call request received from the computer data base; and automatically dialing telephone number of the telephone associated with the computer user by the automatic call distributor in response to the dial request command.

11. The method as recited in claim 10 further comprising the steps of:

detecting when the computer user answers the computer user telephone; and connecting the agent to the answered computer user telephone.

12. The method as recited in claim 1, wherein the step of establishing a computer data base accessible by the computer user further comprises establishing a Web page and wherein the step of prompting the computer user to enter a call request in the computer data base further comprises the step of displaying a "call me" button when the computer user accesses the Web page.

13. A method for establishing voice communications between a computer user and an agent, the computer user being associated with a user computer and a telephone, the method comprising the steps of:

establishing a computer data base which is accessible by the user computer;

receiving a call request by the computer user in the computer data base for the agent to call the computer user, the call request including a telephone number of the telephone associated with the computer user;

transmitting the call request from the computer data base over a computer network to a telephone switching system;

automatically dialing the telephone number of the telephone associated with the computer user by the telephone switching system based on the telephone number in the call request; and automatically connecting the agent to the telephone by the telephone switching system.

14. The method as recited in claim 13 wherein the step of transmitting the call request from the computer data base over a computer network to a telephone switching system comprises the step of transmitting the call request over the Internet.

15. The method as recited in claim 14 wherein the step of transmitting the call request over the Internet further comprises the steps of:

packetizing the call request; and transmitting the call request by e-mail.

16. The method as recited in claim 13 wherein the telephone switching system includes a telephone computer and wherein the step of automatically dialing the telephone number of the telephone associated with the computer user comprises the steps of:

receiving the call request at a telephone computer associated with the agent; and dialing the telephone number by the telephone computer based on the call request.

17. The method as recited in claim 13 wherein the step of connecting the agent to the telephone further comprises the steps of:

detecting when the computer user answers the telephone; and connecting the agent to the answered telephone.

18. The method as recited in claim 13 wherein the step of receiving the call request comprises the step of prompting the computer user to enter the telephone number of the telephone associated with the computer user.

19. The method as recited in claim 18, wherein the step of establishing a computer data base which is accessible by the computer user further comprises establishing a Web page, and wherein the step of prompting the computer user to enter a telephone number further comprises the step of displaying a "call me" button when the computer user accesses the Web page.

20. The method as recited in claim 13 wherein the step of receiving the call request comprises the step of prompting the computer user to enter a time to call the computer user; and wherein the step of automatically dialing the telephone number comprises the step of automatically dialing the telephone number at the time to call.

21. The method as recited in claim 13 wherein the step of receiving the call request comprises the step of prompting the computer user to enter a name of the computer user; and wherein the method further comprises the step of indicating the name of the computer user to the agent before automatically connecting the agent to the telephone.

22. The method as recited in claim 13, wherein the automatically dialing telephone number of the telephone associated with the computer user comprises the steps of:

sending a dial request command from a telephone computer to an automatic call distributor associated with the agent in response to the call request received from the computer data base; and automatically dialing telephone number of the telephone associated with the computer user by the automatic call distributor in response to the dial request command.

23. The method as recited in claim 13, wherein the step of establishing a computer data base which is accessible by the computer user further comprises establishing a Web page.

24. A method for establishing voice communications between a computer user and an agent, the computer user being associated with a user computer and a telephone number of a telephone associated with the computer user, the method comprising the steps of:

establishing a computer database accessible by the use computer;

prompting the computer user to enter a call request in the computer database;

transmitting the call request from the computer database to a telephone switching system having a telephone computer and an automatic call distributor associated with the agent;

sending a dial request command from the telephone computer to the automatic call distributor in response to the call request from the computer database; and automatically dialing the telephone number by the automatic call distributor in response to the dial request command.

25. The method as recited in claim 24 further comprising the steps of:

detecting when the computer user answers the computer user telephone; and connecting the agent to the answered computer user telephone.

26. The method as recited in claim 24, wherein the step of establishing a computer data base accessible by the computer user further comprises establishing a Web page and wherein the step of prompting the computer user to enter a call request in the computer data base further comprises the step of displaying a "call me" button when the computer user accesses the Web page.

27. The method as recited in claim 24 wherein the step of transmitting the call request from the computer data base to a telephone switching system further comprises the steps of:

packetizing the call request; and transmitting the call request by e-mail.

* * * * *